(No Model.) 2 Sheets—Sheet 1.
E. SPANGENBERG.
CAR FENDER.
No. 566,347. Patented Aug. 25, 1896.
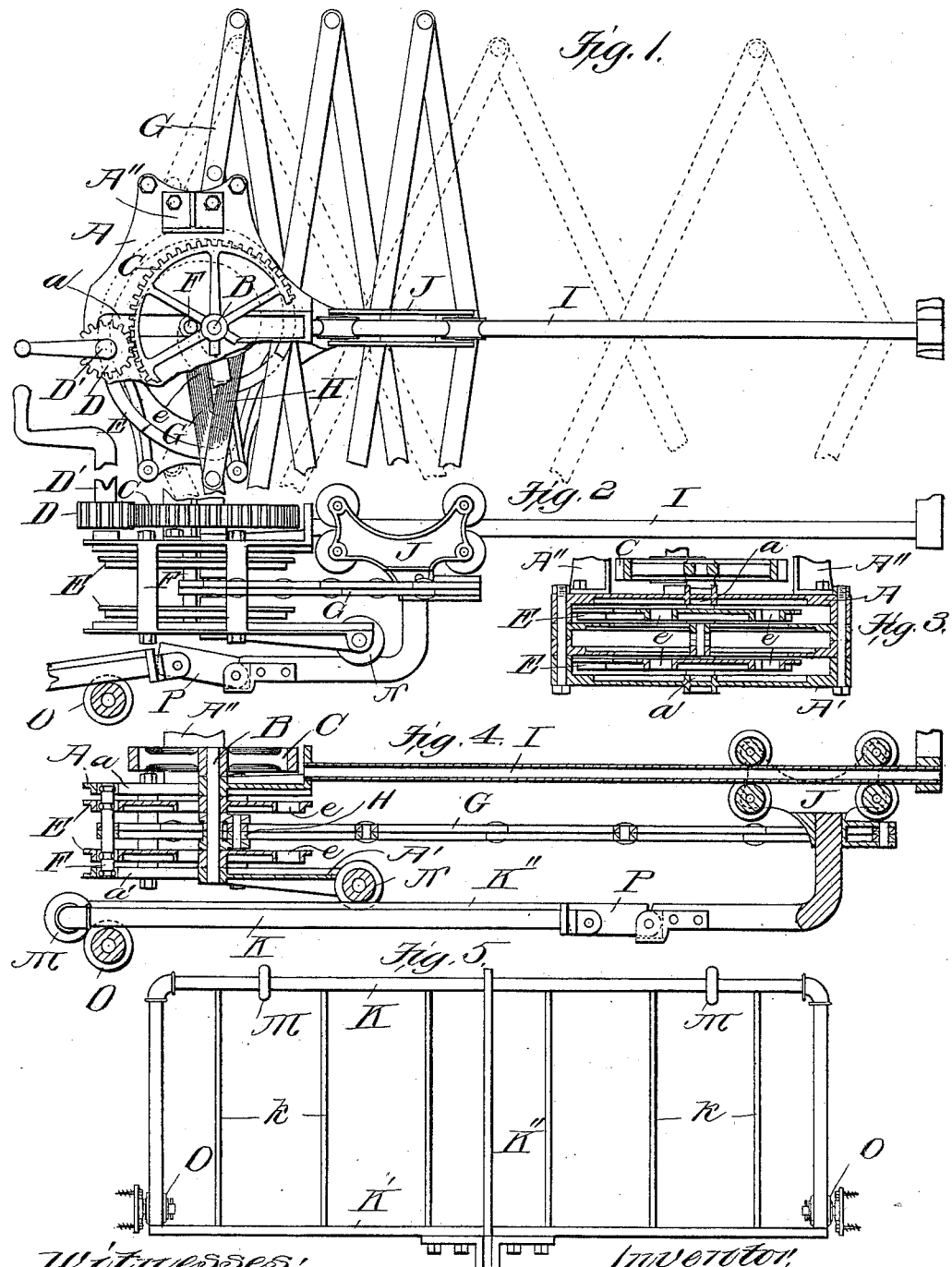
Witnesses:
F. R. Cornwall
Hugh K. Wagner
Inventor,
Eugene Spangenberg
by Paul Bakewell
his atty.

(No Model.) 2 Sheets—Sheet 2.
E. SPANGENBERG.
CAR FENDER.
No. 566,347. Patented Aug. 25, 1896.
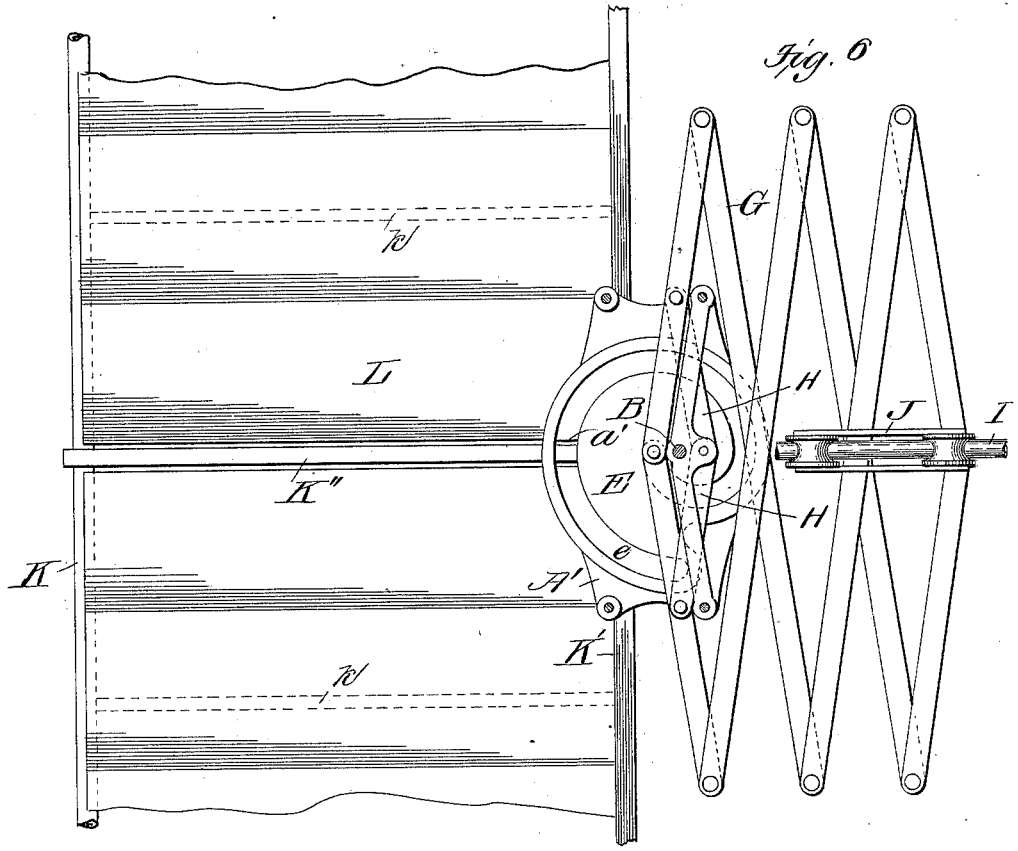
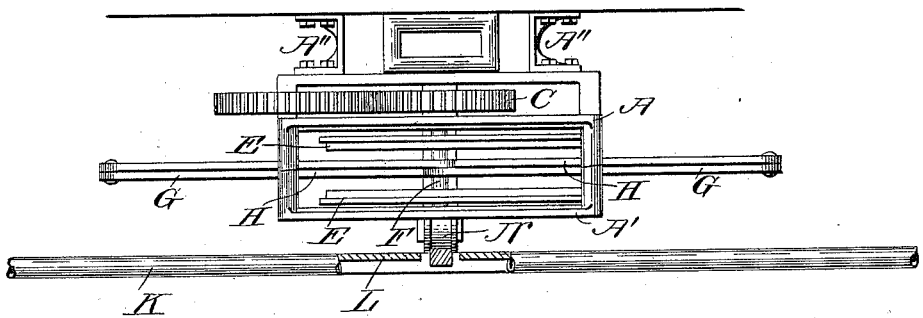
Witnesses:
J. R. Cornwall
Hugh K. Wagner
Inventor,
Eugene Spangenberg
by Paul Bakewell
his atty.

UNITED STATES PATENT OFFICE.

EUGENE SPANGENBERG, OF ST. LOUIS, MISSOURI.

CAR-FENDER.

SPECIFICATION forming part of Letters Patent No. 566,347, dated August 25, 1896.

Application filed December 11, 1895. Serial No. 571,748. (No model.)

*To all whom it may concern:*

Be it known that I, EUGENE SPANGENBERG, a citizen of the United States, residing at the city of St. Louis, State of Missouri, have invented a certain new and useful Improvement in Car-Fenders, of which the following is a full, clear, and exact description, reference being had to the accompanying drawings, forming part of this specification, wherein—

Figure 1 is a top plan view of the fender-operating mechanism. Fig. 2 is a side elevational view of the same, showing the fender projected from beneath the car-platform. Fig. 3 is a cross-sectional view through the fender-operating mechanism. Fig. 4 is a longitudinal sectional view through the fender-operating mechanism, showing the fender in side elevation and retracted to a position beneath the car-platform. Fig. 5 is a plan view of the fender. Fig. 6 is a horizontal sectional view through the operating mechanism, showing the fender projected. Fig. 7 is a front elevational view showing a slightly-modified form of power transmission.

This invention relates to a new and useful improvement in car-fenders; and it consists, generally stated, in mechanism to project or retract a fender from or to beneath a car-platform with very little movement of its operating medium.

The invention further consists in combining a carriage with the fender and in the means for imparting a horizontal motion to said carriage; further, in the provision of a link as an intermediary between the fender and carriage, whereby the fender occupies an inclined position when projected and a horizontal position when retracted, said fender being projected in a horizontal position until it reaches nearly the limit of its outer movement when it is tilted; further, in transmitting a rotary driving motion through parallelograms to a carriage to which the fender is connected, and, finally, in the construction, arrangement, and combination of the several parts, all as will hereinafter be described, and afterward pointed out in the claims.

In the drawings, A indicates a plate, which is preferably secured beneath the platform of a car in any suitable manner or by brackets A'', as shown, and A' is a base-plate or underneath plate secured to plate A, said plates forming practically an inclosing casing for one part of the moving mechanism, and coöperating with said mechanism, as will hereinafter appear.

B is a shaft mounted in said plate, upon the upper end of which is fixed a transmitting-gear C, said gear being driven by a pinion D, mounted on a suitable shaft D', the upper end of which is formed as a crank-handle for affording leverage to turn said shaft, or said power medium may be in the form of a train of gearing, as shown in Fig. 7. By this arrangement (shown in Figs. 1 and 2) great power can be applied to shaft B with but little exertion on the crank-handle. I might say that this crank-handle is so situated above the platform as to be within easy reach of the motorneer or gripman, so as to be operated at any time.

Fixedly mounted on shaft B are two cams E, which are formed with alining spiral cam-grooves $e$, in which operates a pin F, extending through the cams into longitudinally-disposed grooves or slots $a$ and $a'$ in the plates A and A'. If desired, this pin may be provided with sleeves at its point of contact with the cam and plate slots, as shown in Fig. 3, to reduce friction.

G indicates the members of a parallelogram, whose forward members are connected to the pin F, as shown, the fulcrum of said front members being on links H, which are pivoted to a fixed pin just to the rear of shaft B. By this arrangement, when power is imparted to shaft B, the cams E on said shaft will force the pin F forwardly or rearwardly in its guiding-slots $a$ and $a'$, as the case may be, and move pin F from or toward the fixed pivot of links H, causing the outer ends of the front members G to assume a greater or a less angle relative to each other, which will operate the parallelogram, as shown by the dotted lines in Fig. 1. I prefer to locate the links G and H between the cams E, so that the pin F will have the greatest strain at its center, while its ends will be supported by the grooves $a$ and $a'$, the cams operating on the pin between its center and ends.

Extending rearwardly from frame-plate A is a guide-rod I, which is supported at its rear end by a suitable hanger depending from the platform of the car. This rod need not necessarily be supported at its front end by plate A, as any suitable support may be provided, nor need it be located centrally relative to the parallelogram, as two or more of said rods may be used, and the "carriage," as I term it, shown mounted on a single guide-rod, may be mounted on two or more of said rods, as is obvious. In fact, in some instances it may be desirable to provide two such rods, as a centrally-located rod might interfere with the coupler. In this connection I might say that the operating mechanism heretofore described is designed to be located in the center of the under side of the platform, beneath the coupler, the proper spacing being determined by brackets A''. (Shown in Figs. 1 and 7.) This might necessitate the use of some other form of power mechanism to operate the cams, such as a train of gearing, as shown in Fig. 7. The only object in utilizing a train of gearing is to enable the coupler to swing in making curves without interfering with the fender-operating mechanism.

J indicates a carriage mounted on the guide-rod I by suitable flanged rollers located, preferably, above and below the guide-rod, as shown. This carriage is slid along the rod by the parallelogram and projects and retracts the fender from and to beneath the platform of the car.

I will now describe the fender.

The fender, as shown, is constructed of an outer frame of strong piping K, which incloses three of its sides, the fourth side being made up of a solid bar K', which makes the rear end of the fender the heavier. Smaller pipes $k$ extend between the front pipe and rear bar sufficiently close together to conveniently support a platform L of light planking, which I prefer to arrange thereon. I also prefer to mount rollers M on the front pipe, which are adapted to roll on the track when the fender is projected.

In the center of the fender is a bar K'', which is so arranged as to be flush with or slightly above the planking of the fender, there being left a small space between said bar and planking to permit the flanges of a guide-roller N, mounted at the rear of plate A', to roll easily over the rod K''.

Rollers O are mounted in any suitable manner beneath the car-platform, as on the sills, upon which the side pipes of the fender are supported, as shown in Figs. 2, 4, and 5.

P indicates a link which forms the connection between the fender and carriage J, said link permitting the fender to tilt when projected, as shown in Fig. 2. By the arrangement of the rollers N and O it will be noticed that the link P operates only when between said rollers, that is, the fender is nearly out to the limit of its outer movement before it is permitted to drop. This is important, as the fender is thus kept out of contact with the ground the greatest possible length of time, and when the fender is tilted the roller N contacts with the horizontal projection of carriage J, so as to relieve rod I of as much strain as possible.

It will readily be seen that when the cams are revolved the parallelogram will operate the carriage, to which the fender is connected, and that the fender can be quickly dropped in front of the car or be quickly withdrawn to beneath the car-platform above danger of coming in contact with ordinary obstructions.

I am aware that many minor changes in the construction, arrangement, and combination of the several parts of my device may be made and substituted for those herein shown and described without in the least departing from the nature and principle of my invention.

Having thus described my invention, what I claim, and desire to secure by Letters Patent, is—

1. The combination with a car-fender, of a carriage to which the same is connected, a parallelogram for operating the carriage, and cams having spiral grooves in which a pin on the front end of the parallelogram operates, the rotation of the cams distending and contracting the parallelogram; substantially as described.

2. The combination with a car-fender, of a carriage, a link connection between the carriage and fender whereby the fender is held substantially in a horizontal position under the car and in an inclined position when projected, a parallelogram for actuating the carriage and fender, and means for operating the parallelogram; substantially as described.

3. The combination with a car-fender which is mounted on rollers, of a traveling carriage, a link connection between the fender and carriage, a parallelogram for operating the carriage, and a cam-actuated pin to which the forward members of said parallelogram are connected; substantially as described.

4. The combination with the front and side bars formed of pipe, rollers arranged on the front pipe, a rear solid bar which adds weight to the rear of the fender, a central guide-bar, rollers which coöperate with the central and side bars, and means for projecting and retracting said fender, whereby, when the same is in a projected position, it is inclined, and, when in a retracted position, is substantially horizontal; substantially as described.

5. The combination with the plates A and A' formed with the grooves $a$ and $a'$, of a power-shaft mounted in said plates, cams having spiral slots mounted on said shaft, a pin which passes through the cam-slots and into the plate-grooves, and a parallelogram whose front members are connected to said pin, said front members being fulcrumed on pivoted links H; substantially as described.

6. In a car-fender, the combination with a carriage, of a fender-platform, rollers N and O for guiding said platform, and a link connection between the platform and carriage, whereby, when the fender is projected, the same moves in a horizontal plane until the link connection occupies a position between rollers N and O at which time the fender tilts to an inclined position; substantially as described.

7. In a car-fender, the combination with a guide-rod I, of a carriage J adapted to travel upon said rod, a projection extending forwardly from said carriage, a fender, guide-rollers upon which said fender moves, a link connection between the fender and carriage projection, a roller N under which said carriage projection passes when the fender is projected, and means for projecting and retracting said carriage and fender; substantially as described.

8. The combination with a carriage and fender arranged to slide together, of the frame-plates A and A' having the grooves or slots $a$ and $a'$, a pin F operating in said grooves or slots, a parallelogram connected to said pin and to the carriage, and a cam or cams having spiral grooves through which the pin F passes for moving the pin and contracting and distending the parallelogram; substantially as described.

9. The combination with the frame-plates which are adapted to be secured under the platform of a car, of cams mounted in said frame-plates, said cams having spiral grooves, a pin which passes through said cam-grooves, a guideway in the frame-plates for the pin, a parallelogram whose front members are connected to said pin, links H pivoted in the frame and forming movable fulcrums for the front members of said parallelogram, a suitably-guided carriage to which the rear members of the parallelogram are connected, and a fender which is operated by said carriage; substantially as described.

In testimony whereof I hereunto affix my signature, in presence of two witnesses, this 2d day of December, 1895.

EUGENE SPANGENBERG.

Witnesses:
  F. R. CORNWALL,
  HUGH K. WAGNER.